(12) United States Patent
Bensing et al.

(10) Patent No.: US 12,081,100 B2
(45) Date of Patent: Sep. 3, 2024

(54) ELECTRICAL MACHINE WITH BYPASS COOLING DUCT

(71) Applicant: Robert Bosch GmbH, Stuttgart (DE)

(72) Inventors: Felix Bensing, Stuttgart (DE); Florian Mueller, Asperg (DE); Simon Michael Heitzer, Kolbermoor (DE); Stefan Ender, Bergheim (DE)

(73) Assignee: Robert Bosch GmbH, Stuttgart (DE)

( * ) Notice: Subject to any disclaimer, the term of this patent is extended or adjusted under 35 U.S.C. 154(b) by 229 days.

(21) Appl. No.: 17/767,516

(22) PCT Filed: Aug. 11, 2020

(86) PCT No.: PCT/EP2020/072528
§ 371 (c)(1),
(2) Date: Apr. 8, 2022

(87) PCT Pub. No.: WO2021/069132
PCT Pub. Date: Apr. 15, 2021

(65) Prior Publication Data
US 2023/0246512 A1 Aug. 3, 2023

(30) Foreign Application Priority Data

Oct. 10, 2019 (DE) .................. 10 2019 215 582.0
May 13, 2020 (DE) .................. 10 2020 206 000.2

(51) Int. Cl.
*H02K 5/20* (2006.01)
*H02K 9/19* (2006.01)
(52) U.S. Cl.
CPC .............. *H02K 5/203* (2021.01); *H02K 9/19* (2013.01)
(58) Field of Classification Search
CPC ............ H02K 5/203; H02K 5/26; H02K 5/20; H02K 5/18; H02K 9/19; H02K 9/193;
(Continued)

(56) References Cited

U.S. PATENT DOCUMENTS

| 2011/0241458 A1* | 10/2011 | Rai | .................. H02K 11/25 318/473 |
| 2015/0130302 A1* | 5/2015 | Leberle | .................. H02K 9/197 310/54 |
| 2015/0308456 A1 | 10/2015 | Thompson et al. | |

FOREIGN PATENT DOCUMENTS

| DE | 102007035271 A1 | 1/2009 |
| DE | 102010041305 A1 | 3/2012 |

(Continued)

OTHER PUBLICATIONS

English translation DE 102016225521 (Year: 2024).*
(Continued)

*Primary Examiner* — Nguyen Tran
(74) *Attorney, Agent, or Firm* — Michael Best & Friedrich LLP

(57) ABSTRACT

The present invention relates to an electrical machine (1) having a housing (2), wherein the housing (2) has a hollow-cylindrical cooling jacket (2a) for accommodating a stator (3) and, attached to the end sides of the cooling jacket (2a), housing closures (2b), in particular mounting plates, and wherein the cooling jacket (2a) has cooling ducts (4a) running between its end sides (17) and the housing closures (2b) have redirection grooves (4b) so that two adjacent cooling ducts (4a) are fluidically connected by a redirecting groove (4b), whereby the cooling ducts (4a) and the redirecting grooves (4b) form a meandering cooling path (10) which extends through the housing (2) between an inlet (5) and an outlet (6) and through which a coolant can flow, wherein the housing (2) has a bypass duct (7) which fluidically connects the inlet (5) and the outlet (6) while bypassing the meandering cooling path (10), or which fluidically connects two part regions of the meandering cooling path (10) while bypassing one part of the meandering cooling path (10).

18 Claims, 5 Drawing Sheets

(58) Field of Classification Search
CPC ............ H02K 9/197; H02K 9/20; H02K 9/22;
H02K 9/24; H02K 9/26; H02K 9/28;
H02K 9/10; H02K 9/16; H02K 9/12;
H02K 9/14; H02K 9/02; H02K 9/04
See application file for complete search history.

(56) References Cited

FOREIGN PATENT DOCUMENTS

| | | |
|---|---|---|
| DE | 102012215018 A1 | 2/2014 |
| DE | 102016225342 A1 | 6/2018 |
| DE | 102016225521 A1 | 6/2018 |
| EP | 1096647 A2 | 5/2001 |

OTHER PUBLICATIONS

English translation DE 102007035271 (Year: 2024).*
Translation of International Search Report for Application No. PCT/EP2020/072528 dated Nov. 3, 2020 (2 pages).

* cited by examiner

ELECTRICAL MACHINE WITH BYPASS COOLING DUCT

BACKGROUND

The present invention relates to an electrical machine. The electrical machine has, in particular, a cooling path through its housing, wherein a bypass duct to said cooling path is provided.

Electrical machines are known from the prior art. A cooling effect must be provided as the output of the electrical machine increases. To this end, a meandering coolant path is usually formed through the housing of the electrical machine. For example, DE 10 2012 215 018 A1 discloses such a machine.

SUMMARY

As a result of the electrical machine according to the invention, the parameters of heat transfer and pressure loss can be set in a flexible manner. In spite of the use of an axially centrally oriented profiled part, i.e. the cooling jacket, the possibility to influence the heat transfer behavior and the pressure drop of the cooling can thus be increased as compared to the prior art.

The electrical machine according to the invention has a housing. The housing in turn comprises a hollow-cylindrical cooling jacket and also, attached to the end sides of the cooling jacket, housing closures. The cooling jacket serves to accommodate a stator of the electrical machine. The stator of the electrical machine can thus be cooled by the cooling jacket. The cooling jacket has cooling ducts running between its end sides. The housing closures in turn have redirecting grooves. The redirecting grooves and the cooling ducts are fluidically connected in such a way that two adjacent cooling ducts are fluidically connected to one redirecting groove. In this way the cooling ducts and the redirecting grooves form a continuous cooling path. The cooling path extends through the housing between an inlet and an outlet. It is provided in particular that the cooling path extends in a meandering fashion through said housing. A coolant can flow along the cooling path and can thus cool the housing and in particular the stator of the electrical machine.

It is advantageously provided that the housing has a bypass duct. The inlet and outlet are fluidically connected by the housing while bypassing the meandering cooling path. Part of the coolant supplied at the inlet can thus pass directly to the outlet through the bypass duct. In particular, parameters such as the pressure drop between inlet and outlet can thus be reduced. Alternatively, the bypass duct can also fluidically connect two part regions of the meandering cooling path, wherein in this case only one part of the meandering cooling path is bypassed. The fundamental effect of the bypass duct remains the same as previously described. In particular, parameters such as pressure drop between inlet and outlet can be adjusted.

It is preferably provided that the housing between cooling jacket and housing closure has a seal in each case. The seal has cutouts corresponding to the cross section of the cooling ducts so that the coolant can pass from the cooling duct to the redirecting groove through the cutout. The coolant can also pass from the redirecting groove to the cooling duct through the cutout. Since one of the cooling ducts is connected to the inlet and one of the cooling ducts is connected to the outlet, corresponding cutouts are thus provided in the seal 11. A connecting duct is provided between the two cutouts which are associated with the cooling duct connected to the inlet and with the cooling duct connected to the outlet. In this way, the bypass duct is realized in the seal. The coolant can pass in turn from the inlet, through the seal, and to the outlet, wherein the meandering cooling path is bypassed by the housing.

In a further preferred embodiment, the bypass duct is realized by a connecting groove in the cooling jacket and/or a housing closure. The bypass duct can thus be realized by a simple and economical production process. In particular, merely a groove must be formed in the cooling jacket and/or the housing closure, for example by a milling process.

One of the housing closures particularly preferably has both the inlet and also the outlet. It is provided here that the inlet is fluidically connected to an inlet groove and the outlet is fluidically connected to an outlet groove of the corresponding housing closure. The inlet groove and the outlet groove are each fluidically connected to an individual cooling duct of the cooling jacket. The connecting groove in this case connects the inlet groove and the outlet groove, so that a fluid communication exists between inlet groove and outlet groove and thus between the inlet and outlet. The bypass duct is thus realized in a simple and economical way. The connecting groove can in turn be produced easily and with little effort, for example by a milling process. It is particularly preferably provided that the redirecting grooves, the connecting groove, the inlet groove and the outlet groove are all arranged along the same circular path. A simple and economical production and assembly is thus ensured. In addition, the flow is not negatively affected by the connecting groove.

The radial extent of the inlet groove, the outlet groove and the connecting groove are preferably identical. Manufacturing is thus simplified in turn. The combined extent of inlet groove, outlet groove and connecting groove in the circumferential direction is preferably identical to the corresponding extension of each of the redirecting grooves along the circumferential direction. A homogeneous structure of the housing closure is thus achieved.

The ratio of height to width of the bypass duct is preferably between 1.0 and 4.0. Said ratio is particularly preferably between 1.2 and 3.5. As a result of such a ratio, a pressure loss over the entire cooling path between inlet and outlet is optimized.

The bypass duct advantageously starts upstream of the first cooling duct to be passed through by the coolant and ends downstream of the last cooling duct to be based through by the coolant. In this way, the previously described bypassing of the meandering cooling path is achieved in an optimal fashion. To this end, the bypass duct can be provided in particular, as described before, in the seal and/or in the housing closure and/or in the cooling jacket.

The coolant is particularly preferably water or is water-based. The coolant thus can be produced easily and economically, is not environmentally unfriendly or is only environmentally unfriendly to a small extent, and allows reliable cooling of the housing of the electrical machine and thus in particular of the stator of the electrical machine.

The housing closures, as already described previously, are preferably mounting plates. These serve to mount a rotor of the electrical machine rotatably. In particular, rolling elements are provided, at which the rotor is mounted rotatably on the housing closures.

BRIEF DESCRIPTION OF THE DRAWINGS

Exemplary embodiments of the invention will be described in detail hereinafter with reference to the accompanying drawing, in which.

DETAILED DESCRIPTION

Figure 1:
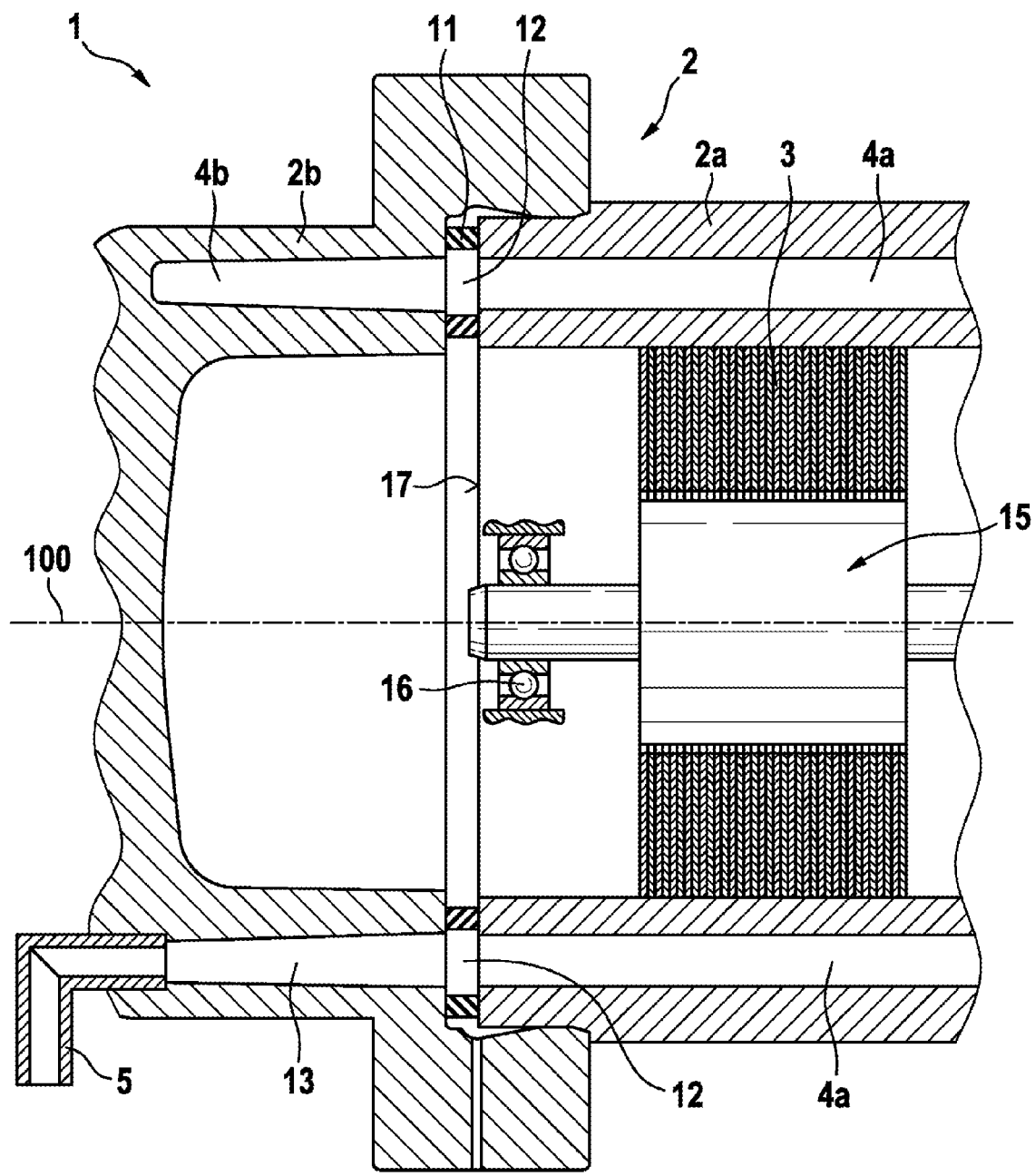
FIG. 1 is a schematic sectional view of an electrical machine in which the invention can be used.

FIG. 1 schematically shows an electrical machine 1 in which the invention can be used. The electrical machine 1 has a housing 2, which comprises a cooling jacket 2a. The cooling jacket 2a serves in particular to accommodate a stator 3 of the electrical machine 1. A rotor 15 of the electrical machine 1 is driveable by the stator 3.

The rotor 15, during operation of the electrical machine 1, rotates about a center axis 100. The center axis 100 is in particular also a center axis of the stator 3 and also the cooling jacket 2a.

In order to be able to dissipate waste heat during operation of the electrical machine 1, the cooling jacket 2a is provided with multiple cooling ducts 4a running between the end sides 17 of the cooling jacket 2a, for example in the axial direction in relation to the center axis 100 and for example parallel to one another.

A housing closure 2b is formed at each of the end sides 17, wherein the housing closures 2b are embodied preferably as mounting plates. In particular, it is provided that the rotor 15 is mounted rotatably on the particular housing closure 2b via a rolling bearing 16, wherein the arrangement of the rolling bearing 16 is shown merely schematically in FIG. 1. The housing closure 2b can thus also be embodied solely as a housing cap, without accommodating the rolling bearing 16. In this case it is provided that the rotor 15 is mounted on the cooling jacket 2a via the rolling bearing 16.

The two housing closures 2b can be separate housing parts. Alternatively, one of the two housing closures 2b can be part of the cooling jacket 2a, which in this case would be pot-shaped. Such a pot-shaped cooling jacket 2a has a hollow-cylindrical cooling jacket portion which has the cooling ducts 4a running between its (covered, not accessible) end sides 17.

Each two adjacent cooling ducts 4a of the cooling jacket 2a are fluidically connected by a redirecting groove 4b formed in the corresponding housing closure 2b, which will be explained in greater detail hereinafter with reference to FIG. 3.

A seal 11 is arranged at least between one of the housing closures 2b and the cooling jacket 2a. The seal 11 has cutouts 12 so that fluid can pass from the relevant cooling duct 4a of the cooling jacket 2a to the relevant redirecting groove 4b of the housing closure 2b, and vice versa.

In addition, it is provided that an inlet 5 and an outlet 6 (see FIG. 2) are arranged on the housing closure 2b. As shown in FIG. 1, the inlet 5 is connected to an inlet groove 13. The coolant can pass from the inlet groove 13, through a matching cutout 12 in the seal 11, into one of the cooling ducts 4a. The same is true, in the reverse order, for the outlet 6, which is not shown, however, in FIG. 1.

Figure 2:
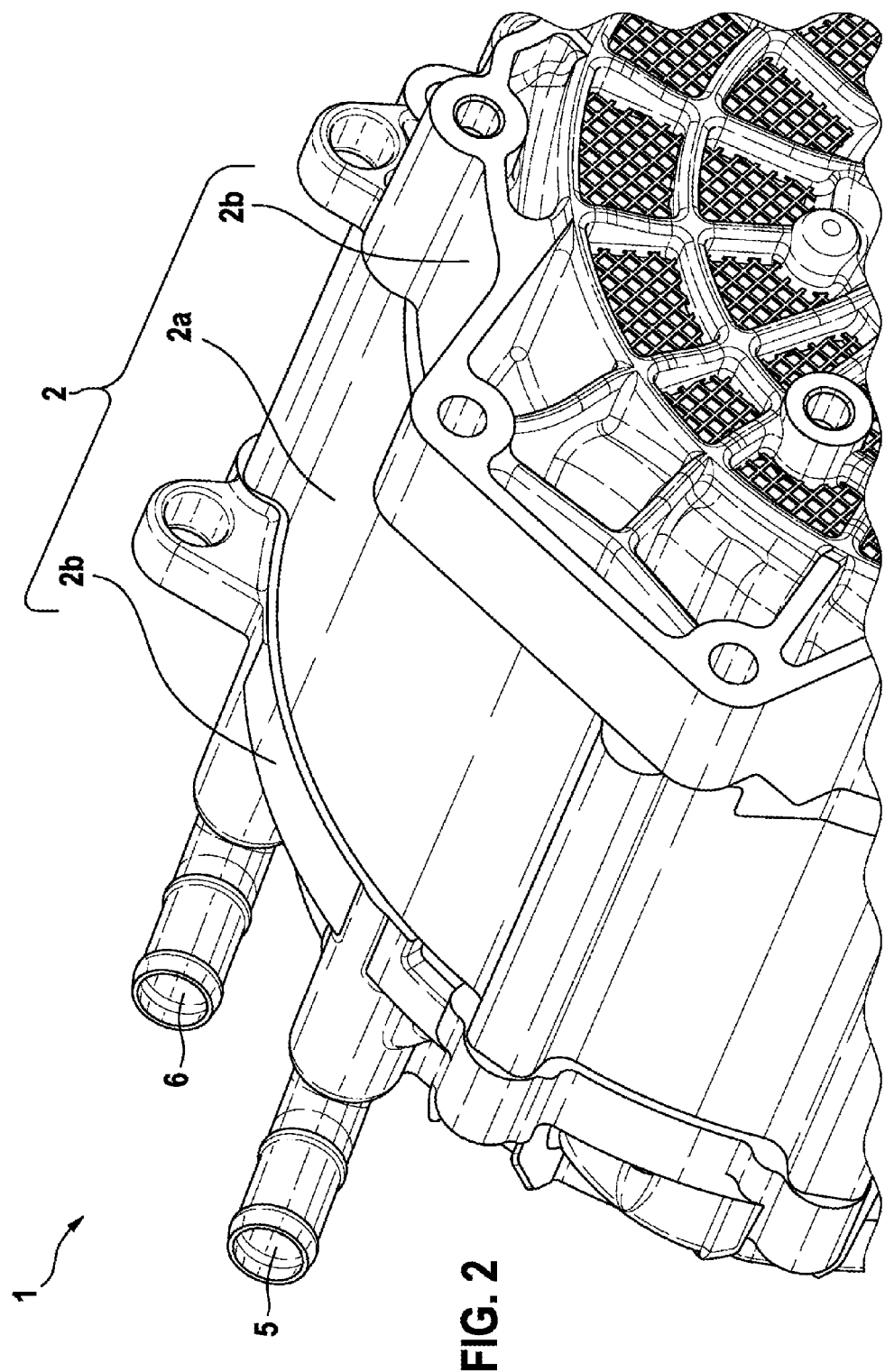
FIG. 2 is a schematic three-dimensional illustration of the electrical machine according to FIG. 1.

FIG. 2 schematically shows a three-dimensional illustration of the electrical machine 1 according to FIG. 1. In particular, it is shown that the housing 2 has a cooling jacket 2a and, attached to the end sides 17 (see FIG. 1) of the cooling jacket 2a, housing closures 2b. Merely one of the housing closures 2b has the inlet 5 and the outlet 6.

Figure 3:
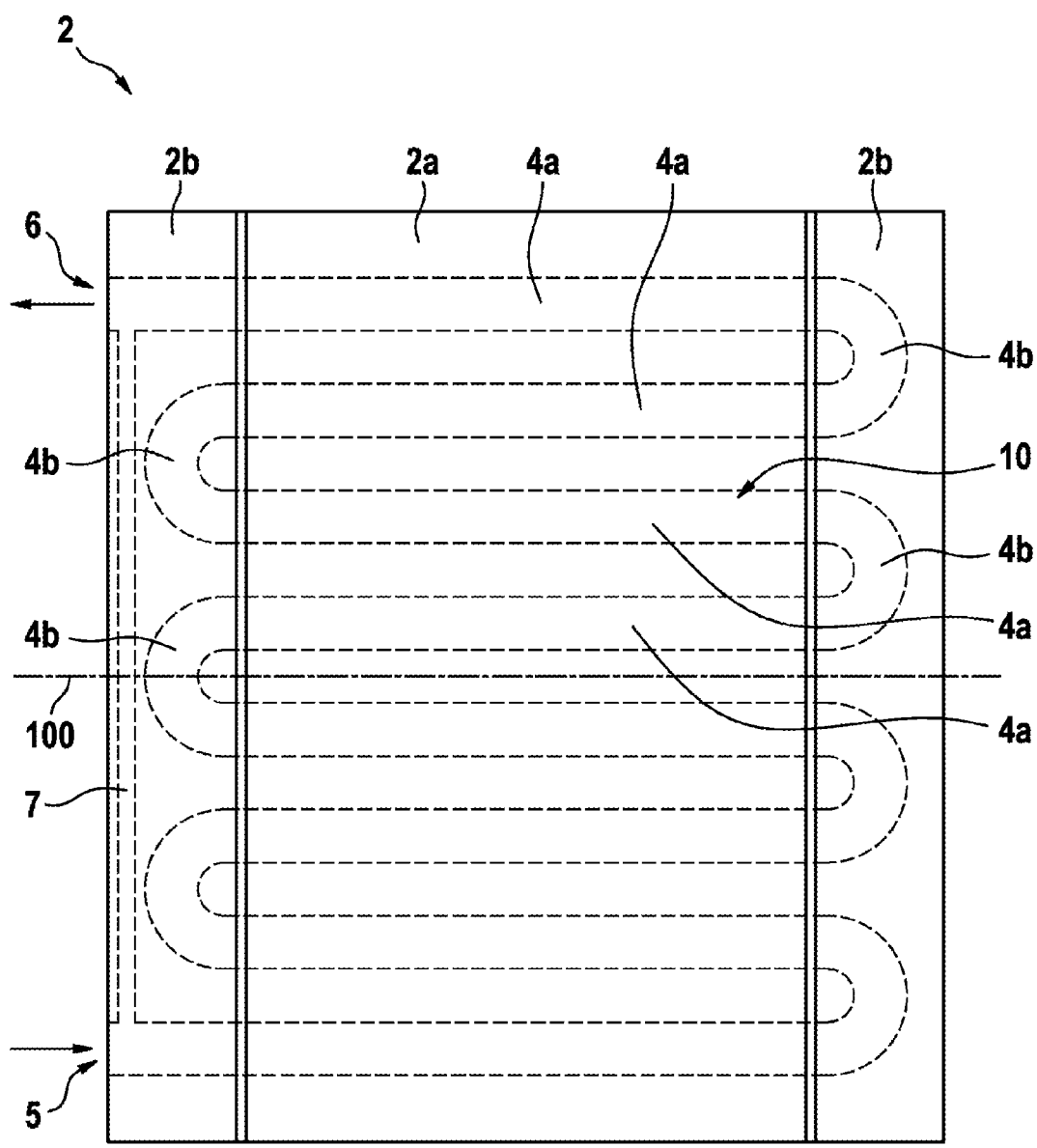
FIG. 3 is a schematic side view of the electrical machine according to FIG. 1 and FIG. 2 according to a first exemplary embodiment of the invention.

It is schematically shown in FIG. 3 how a cooling path runs through the housing 2. It is thus provided that one of the two housing closures 2b, as already shown in FIG. 2, has both the inlet 5 and the outlet 6. In addition, each housing closure 2b has multiple redirecting grooves 4b. The cooling ducts 4a are connected in meandering fashion by the redirecting grooves 4b of both housing closures 2b so that a continuous cooling path 10 runs from the inlet 5 in meandering fashion to the outlet 6. It is thus ensured that the coolant flows through the housing 2 reliably and can absorb heat from the entire stator. Effective cooling is thus ensured.

In order to reduce a pressure drop between the inlet 5 and the outlet 6, in accordance with the invention a bypass duct 7 is provided in the housing 2, for example in the separate housing closure 2b. Cooling fluid can thus pass from the inlet 5, via the bypass duct 7, directly or immediately to the outlet 6, without having to enter the cooling jacket 2a for this purpose. A bypassing of the meandering cooling path 10 is thus achieved. In an alternative embodiment, the bypass duct 7 can also connect two part regions of the meandering cooling path so that only one part of the meandering cooling path 10 is bypassed.

Figure 4:
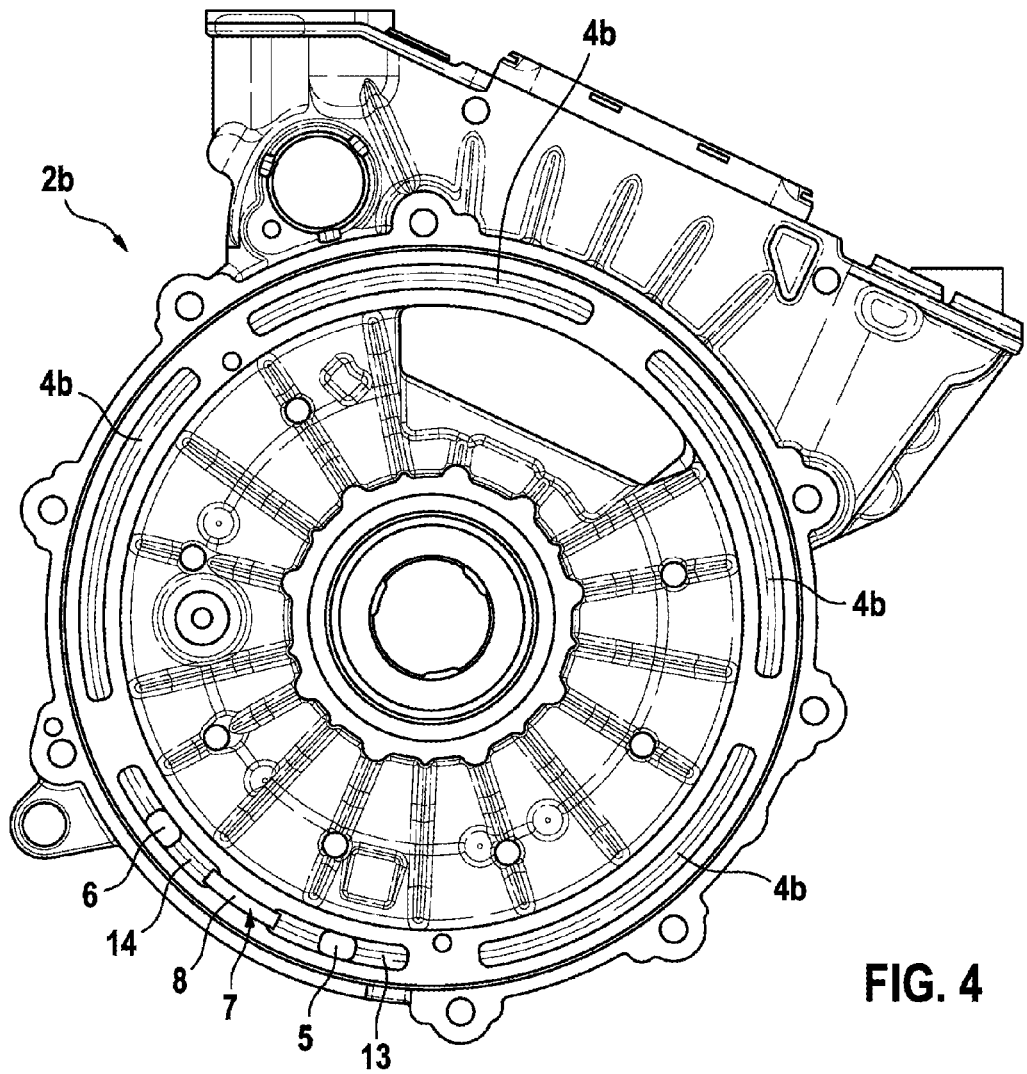
FIG. 4 is a schematic view of a housing closure of the electrical machine according to the first exemplary embodiment of the invention.
Figure 5:
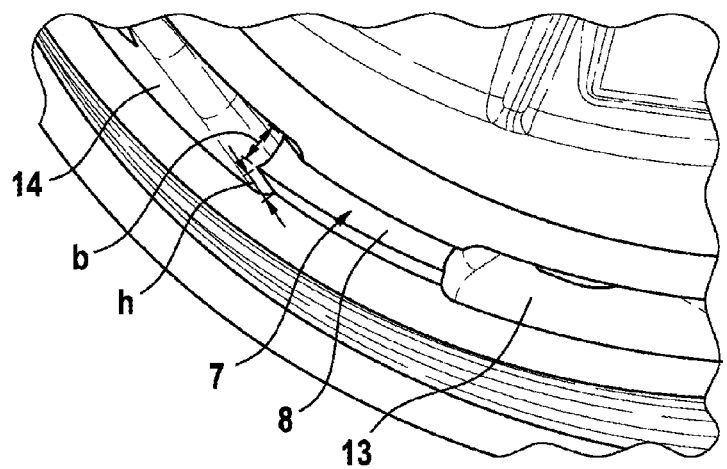
FIG. 5 is a schematic detailed view of the housing closure of the electrical machine according to the first exemplary embodiment of the invention.

FIGS. 4 and 5 schematically show a separate housing closure 2b of the electrical machine 1 according to the exemplary embodiment of the invention. Said housing closure 2b has multiple redirecting grooves 4b, which, as already described previously, each fluidically connect two adjacent cooling ducts 4a of the cooling jacket 2a. An inlet groove 13 is additionally provided, which is fluidically connected to the inlet 5. An outlet groove 14 is fluidically connected to the outlet 6. The redirecting grooves 4b, the inlet groove 13 and the outlet groove 14 are formed on an end-side joining face, which is intended for joining to a joining face of the cooling jacket 2a. The cooling ducts 4a of the cooling jacket 2a open out with corresponding openings into the joining face of the cooling jacket 2a.

As is shown in detail in particular in FIG. 5, a connecting groove 8 runs between the inlet groove 13 and the outlet groove 14 in order to thus form the bypass duct 7. Here, the connecting groove 8 can be produced easily and economically, for example by milling. A fluid flow through the meandering cooling path 10 can be adjusted in an optimized fashion on the basis of a ratio of height h to width b of the bypass duct 7. An optimized pressure drop between inlet 5 and outlet 6 is thus provided in particular for a ratio of height h to width b of the bypass duct 7 between 1.0 and 4.0, preferably between 1.2 and 3.5.

The connecting groove 8, the inlet groove 13, the outlet groove 14 and the redirecting grooves 4b are merely arranged, in relation to the center axis 100, for example on the same circular path around said center axis 100. In addition it can be provided that a radial extension of the connecting groove 8, the inlet groove 13, the outlet groove 14 and the deflection grooves 4b is identical. A simple and economical housing closure 2b, which at the same however is optimized in respect of its cooling power, can thus be provided.

It is shown in FIGS. 4 and 5 that the connecting groove 8 is provided in the joining face of the separate housing closure 2b. Alternatively or additionally, the connecting groove 8 can also be provided on the corresponding joining face of the cooling jacket 2a.

Figure 6:
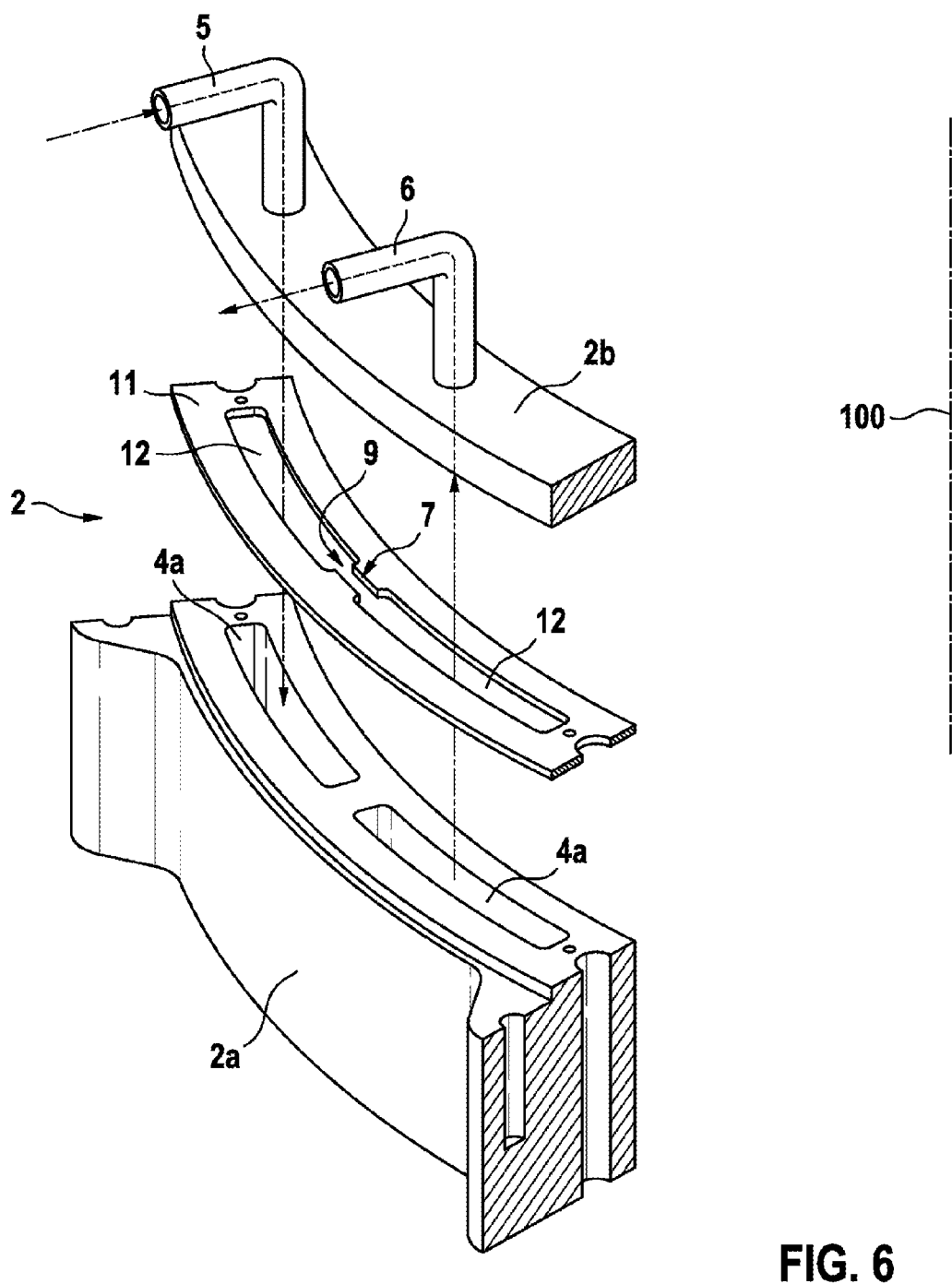
FIG. 6 is a schematic exploded illustration of the housing of the electrical machine according to a second exemplary embodiment of the invention.

A further possibility for the design of the bypass duct 7 is shown in FIG. 6.

FIG. 6 is a schematic exploded illustration of at least a part of the housing 2 of the electrical machine 1 according to a second exemplary embodiment of the invention.

The seal 11, as already described previously, for example has cutouts 12. The cutouts 12 are formed correspondingly to a cross section of the cooling ducts 4a. If the bypass duct 7 is to be formed in the seal 11, a connecting duct 9 is thus advantageously provided between two of these cutouts 12. For example, one of the cutouts 12 is associated with the cooling duct 4a that is fluidically connected to the inlet 5. The other cutout 12 is associated with the cooling duct 4a that is fluidically connected to the outlet 6. A way of allowing the coolant to bypass the cooling path 10 through the connecting duct 9 is thus provided in turn. The cooling path 10 is in turn bypassed upstream of the first cooling duct 4a to be passed through and downstream of the last cooling duct 4a of the cooling jacket 2a to be passed through. In the exemplary embodiment shown in FIG. 6, only the seal 11 is to be provided with the bypass duct 7. No changes are necessary to the cooling jacket 2a or the housing closure 2b. A simple and economical production and assembly are thus provided.

The previously described exemplary embodiments can also be combined particularly advantageously so that, for example, the bypass duct 7 is formed both in the seal 11 and in the housing closure 2b.

In any case, a pressure drop between the inlet 5 and outlet 6 is reduced by the bypass ducts 7 according to the invention. In particular, the pressure drop can be adjusted to a predefined value easily and with little effort on the basis of a dimensioning of the bypass duct.

The invention claimed is:

1. An electrical machine (1) having a housing (2),
wherein the housing (2) has a hollow-cylindrical cooling jacket (2a) to accommodate a stator (3) and has, attached to end sides on the cooling jacket (2a), housing closures (2b),
wherein the cooling jacket (2a) has cooling ducts (4a) running between the end sides (17), and the housing closures (2b) have redirecting grooves (4b) so that two adjacent cooling ducts (4a) are fluidically connected by a redirecting groove (4b), whereby the cooling ducts (4a) and redirecting grooves (4b) form a continuous cooling path (10) through the housing (2), said cooling path running in meandering fashion between an inlet (5) and an outlet (6),
wherein the housing (2) has a bypass duct (7) which fluidically connects the inlet (5) and the outlet (6) while bypassing the meandering cooling path (10) or which fluidically connects two part regions of the meandering cooling path (10) while bypassing a part of the meandering cooling path (10),
wherein the bypass duct (7) is formed by a connecting groove (8) in the cooling jacket (2a) and/or the housing closure (2b),
wherein one of the housing closures (2b) has the inlet (5) and the outlet (6),
wherein the inlet (5) is fluidically connected to an inlet groove (13) and the outlet is fluidically connected to an outlet groove (14) of the housing closure (2b),
wherein the inlet groove (13) and the outlet groove (14) are each fluidically connected to an individual cooling duct (4a) of the cooling jacket (2a), and
wherein the connecting groove (8) fluidically connects the inlet groove (13) and the outlet groove (14).

2. The electrical machine (1) as claimed in claim 1, wherein the redirecting grooves (4b), the connecting groove (8), the inlet groove (13) and the outlet groove (14) are arranged along a same circular path.

3. The electrical machine (1) as claimed in claim 1, wherein a radial extension of the inlet groove (13), the outlet groove (14) and the connecting groove (8) are identical.

4. The electrical machine (1) as claimed in claim 1, wherein a ratio of height (h) to width (b) of the bypass duct (7) is between 1.0 and 4.0.

5. The electrical machine (1) as claimed in claim 1, wherein the bypass duct (7) starts upstream of a first cooling duct (4a) to be passed through by coolant and downstream of a last cooling duct (4a) to be passed through by the coolant.

6. The electrical machine (1) as claimed in claim 5, wherein the coolant is water or water-based.

7. The electrical machine (1) as claimed in claim 1, wherein a rotor (15) is mounted rotatably on the housing closures (4b).

8. The electrical machine (1) as claimed in claim 1, wherein the housing closures (2b) are mounting plates.

9. The electrical machine (1) as claimed in claim 2, wherein a radial extension of the inlet groove (13), the outlet groove (14) and the connecting groove (8) are identical.

10. The electrical machine (1) as claimed in claim 4, wherein the ratio of height (h) to width (b) of the bypass duct (7) is between 1.2 and 3.5.

11. The electrical machine of claim 7, wherein the rotor (15) is mounted rotatably on the housing closures (4b) via roller bearings (16).

12. An electrical machine (1) having a housing (2),
wherein the housing (2) has a hollow-cylindrical cooling jacket (2a) to accommodate a stator (3) and has, attached to end sides on the cooling jacket (2a), housing closures (2b),
wherein the cooling jacket (2a) has cooling ducts (4a) running between the end sides (17), and the housing closures (2b) have redirecting grooves (4b) so that two adjacent cooling ducts (4a) are fluidically connected by a redirecting groove (4b), whereby the cooling ducts (4a) and redirecting grooves (4b) form a continuous cooling path (10) through the housing (2), said cooling path running in meandering fashion between an inlet (5) and an outlet (6),
wherein the housing (2) has a bypass duct (7) which fluidically connects the inlet (5) and the outlet (6) while bypassing the meandering cooling path (10) or which fluidically connects two part regions of the meandering cooling path (10) while bypassing a part of the meandering cooling path (10)
wherein the housing (2) has a seal (11) between the cooling jacket (2a) and the housing closure (2b),
wherein the seal (11) has cutouts (12), and
wherein, in order to form the bypass duct (7), a connecting duct (9) is formed between the cutout (12) associated with the cooling duct (4a) connected to the inlet (5) and the cutout (12) associated with the cooling duct (4) connected to the outlet (6).

13. The electrical machine (1) as claimed in claim 12, wherein the cutouts (12) correspond to a cross section of the cooling ducts (4a).

14. The electrical machine (1) as claimed in claim 12, wherein the bypass duct (7) starts upstream of a first cooling duct (4a) to be passed through by coolant and downstream of a last cooling duct (4a) to be passed through by the coolant.

15. The electrical machine (1) as claimed in claim 14, wherein the coolant is water or water-based.

16. The electrical machine (1) as claimed in claim 12, wherein a rotor (15) is mounted rotatably on the housing closures (4b).

17. The electrical machine (1) as claimed in claim 12, wherein the housing closures (2b) are mounting plates.

18. The electrical machine of claim 17, wherein the rotor (15) is mounted rotatably on the housing closures (4b) via roller bearings (16).

\* \* \* \* \*